United States Patent
Upton et al.

(10) Patent No.: US 8,112,490 B2
(45) Date of Patent: Feb. 7, 2012

(54) SYSTEM AND METHOD FOR PROVIDING A VIRTUAL ENVIRONMENT WITH SHARED VIDEO ON DEMAND

(76) Inventors: Kevin S. Upton, Amherst, NY (US);
Brian Wiener, Thousand Oaks, CA (US); Christopher Tata, Palm Beach Gardens, FL (US)

( * ) Notice: Subject to any disclaimer, the term of this patent is extended or adjusted under 35 U.S.C. 154(b) by 0 days.

(21) Appl. No.: 12/466,198

(22) Filed: May 14, 2009

(65) Prior Publication Data
US 2009/0287790 A1 Nov. 19, 2009

Related U.S. Application Data

(60) Provisional application No. 61/008,936, filed on May 15, 2008, provisional application No. 61/190,659, filed on Sep. 2, 2008, provisional application No. 61/114,585, filed on Nov. 14, 2008.

(51) Int. Cl.
*G06F 15/16* (2006.01)
(52) U.S. Cl. ....................................... 709/208
(58) Field of Classification Search .................. 709/208
See application file for complete search history.

(56) References Cited

U.S. PATENT DOCUMENTS

| | | | |
|---|---|---|---|
| 6,437,818 B1 * | 8/2002 | Ludwig et al. | 348/14.09 |
| 2008/0059580 A1 | 3/2008 | Kalinowski et al. | |
| 2008/0059986 A1 * | 3/2008 | Kalinowski et al. | 725/1 |
| 2008/0209021 A1 * | 8/2008 | Shamma | 709/223 |

FOREIGN PATENT DOCUMENTS

| | | |
|---|---|---|
| WO | WO2008112944 | 9/2008 |
| WO | WO2009047750 | 4/2009 |

OTHER PUBLICATIONS

International Search Report and Written Opinion; Jul. 13, 2009.

* cited by examiner

*Primary Examiner* — Jeffrey Pwu
*Assistant Examiner* — Farhad Ali
(74) *Attorney, Agent, or Firm* — Pillsbury Winthrop Shaw Pittman LLP (57) ABSTRACT

A system and methodology for creating, compiling, managing and distributing works of multimedia within a virtual space (environment) or virtual meeting space. The system consists of a server and client architecture. Within this architecture, the server or controller plays a "master" role, pulling, storing, and delivering media content from a plurality of client sources. The master server or controller manipulates the storage and delivery of these streams through an intelligent database and programming architecture. These streams are encoded to a specific format and delivered through a server to single or multiple recipients as a vital component of a complete virtual meeting experience. The result is a complete and organized virtual meeting room experience from attendee invitation though follow-up and record meeting dispersal.

15 Claims, 6 Drawing Sheets

Invite Friends

Invite your friends to join you in your Channel. SVOD is all about simultaneous sharing! Recipients will receive an email with a link to your channel.

Choose a Date
03 / 30 / 2009

Choose a Time
10 : 00 AM

My Time Zone
(GMT-08:00) Pacific Time (US & Canada)

* = required

Email Message
You've gotta come watch this with me. Funniest thing I have ever seen!!! OMG

Email To:
filmfreak@gmail.com

Send Invites

Privacy Policy
We will not EVER share your personal information or contacts with anyone.

FIG. 7

SYSTEM AND METHOD FOR PROVIDING A VIRTUAL ENVIRONMENT WITH SHARED VIDEO ON DEMAND

RELATED APPLICATIONS

The present application claims priority to U.S. Provisional Patent Application Ser. Nos. 61/008,936, 61/190,659, and 61/114,585 filed May 15, 2008, Sep. 2, 2008, and Nov. 14, 2008, respectively, all of which are herein incorporated by reference in their entirety.

FIELD OF THE INVENTION

The present invention related generally to virtual environments with multiple participants, and more particularly, to virtual environments in which participants can view video and other media simultaneously.

BACKGROUND OF THE INVENTION

The Internet represents a huge forum for the sharing of ideas and concepts. Newsgroups, bulleting boards, and the like, all allow individuals to post information in a virtual space organized around a particular topic, issue, question, etc. . . . While this allows the individuals to share information, post questions & answers, generally, information is not shared with all users at the same, but is more dependent on when a user accesses the information.

The Internet (and other networks) do allow for more instantaneously communications, e.g., in the form of instant messaging, video messaging.

However, while it is possible to post media, such as video files, to newsgroups, bulletin boards, and the like, which may be either downloaded for play later, or for streaming to a particular user, such viewings occurred at the initiation of, and control of individual users. Therefore, the users are not generally viewing such media at the same time, or the playback is not synchronized. This results in a barrier to the free flow of discussion, and ideas regarding the viewed media.

Furthermore with the advancement of Internet technology, new methods to gather together users of similar interest or business agendas for the purpose of delivering and sharing ideas and related materials within a virtual space has become apparent. These virtual meetings are often confusing to the attendees due to the logistical nature of disparate geography causing a disconnect in communication and overall productivity.

The present invention is aimed at one or more of the problems identified above.

SUMMARY OF THE INVENTION

In one aspect of the present invention, a system for providing virtual environments in which multiple participants may view video is provided. The system includes a master remote device, a secondary remote device, a media server and an operations server. The master remote device is usable by a first participant and allows the first participant to initiate creation of a virtual environment. The secondary remote device is usable by a second participant. The media server is networked to the master remote device and the secondary device and provides access to at least one video file. The operations server is networked to the master remote device, the secondary remote device and the media server and creates a shared object in response to the first participant initiating creation of the virtual environment at the master remote device. The shared object is associated with the virtual environment. The operations server provides the first participant access to the shared object and allows the first participant to control playback of the at least one video file on the master remote device. The operations server allows the second participant to view the at least one video file through the shared object, simultaneously with, and as controlled by, the first participant.

In another aspect of the invention, a system for providing virtual meeting environments in which multiple participants may view video and participate in discussions is provided. The system includes a master remote device, a secondary remote device, a media server, and an operations server. The master remote device is usable by a first participant and allows the first participant to initiate creation of a virtual meeting environment. The secondary remote device is usable by a second participant. The media server is networked to the master remote device and the secondary device and provides access to at least one video file. The operations server is networked to the master remote device, the secondary remote device and the media serve and creates a shared object in response to the first participant initiating creation of the virtual meeting environment at the master remote device. The shared object is associated with the virtual environment. The operations server provides the first participant access to the shared object and allows the first participant to control playback of the at least one video file on the master remote device. The operations server allows the second participant to view the at least one video file through the shared object, simultaneously with, and as controlled by, the first participant. The operations server provides first and second video conferencing window. The first video conferencing window is associated with the first participant for displaying a live video stream of the first participant on the second remote device. The second video conferencing window is associated with the second participant for displaying a live video stream of the second participant on the first remote device.

In a third aspect of the present invention, a system for providing virtual meeting environments in which multiple participants may view video and participate in discussions is provided. The system includes a master remote device, a plurality of secondary remote devices, a media server, and an operations server. The master remote device is usable by a first participant and allows the first participant to initiate creation of a virtual meeting environment. The plurality of secondary remote devices are usable by a plurality of secondary participants. The media server is networked to the master remote device and the secondary devices and providing access to at least one video file. The operations server is networked to the master remote device, the secondary remote devices and the media server. The operations server creates a shared object in response to the first participant initiating creation of the virtual meeting environment at the master remote device. The shared object is associated with the virtual environment. The operations server provides the first participant access to the shared object and allows the first participant to play, pause, fast forward and playback of the at least one video file on the master remote device. The operations server allows the second participants to view the at least one video file through the shared object, simultaneously with, and as controlled by, the first participant. The operations server allows control of the shared object to be passed to one of the secondary participants. The operations server provides a plurality of video conferencing windows each being associated with one of the participants for displaying a live video stream of the respective participant. The video conferencing window of one of the participants is displayed on at least one of the remote devices. The operations server provides at least one of a video chat feature, a text chat feature, and a white board feature on the remote devices.

BRIEF DESCRIPTION OF THE DRAWINGS

Other advantages of the present invention will be readily appreciated as the same becomes better understood by reference to the following detailed description when considered in connection with the accompanying drawings wherein.

DETAILED DESCRIPTION OF INVENTION

Referring to the Figures, wherein like numerals indicate like or corresponding parts throughout the several views, a system 10 and which provides virtual environments in which multiple participants may view video simultaneously, and under the control of at least one of the participants.

Figure 1:
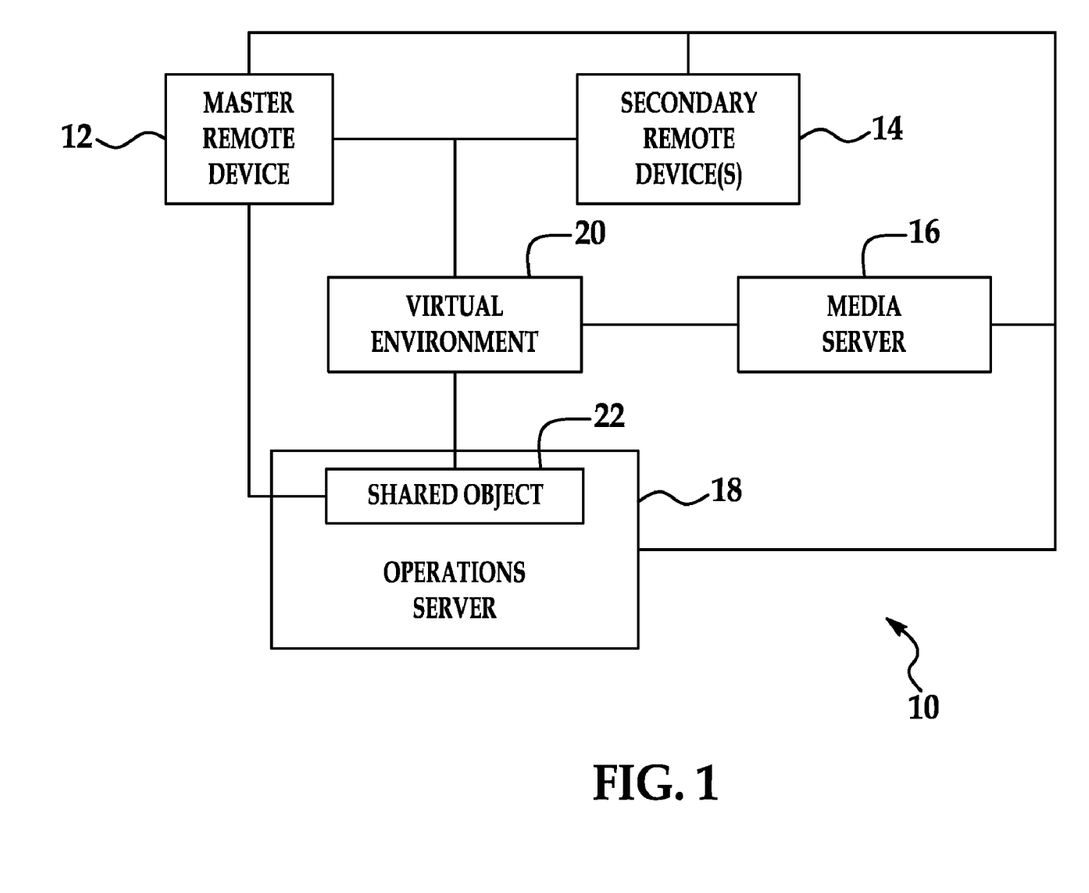
FIG. 1 is a block diagram of a system for providing virtual environments in which multiple participants may view video, according to an embodiment of the present invention.

With particular reference to FIG. 1, in one embodiment the system 10 includes a master remote device 12, one or more secondary remote devices 14, a media server 16, and an operations server 18. The master remote device 12 usable by a first participant and allows the first participant to initiate creation of a virtual environment 20.

The secondary remote device 14 is usable by a second participant. The media server 16 is networked to the master remote device 12 and the secondary remote device(s) 14. The media server 16 provides access to at least one video file.

The remote devices 14, 16 may be computer, e.g., general purpose computers which are connected to the Internet. However, other types of devices may be used, such as cell phones, notebook computers, personal digital assistants, and other devices capable of communicating across networks and viewing media files.

In one embodiment, the remote devices 14, 16 may access the system 10 through a web browser.

The operations server 16 is networked to the master remote device 12, the secondary remote device 14 and the media server 16. The operations server 18 creates a shared object 22 in response to the first participant initiating creation of the virtual environment 20 at the master remote device 12.

In one aspect, the shared object 22 is an instance of a computer programming language object. The system 10 can support multiple virtual environments 20, each having an associated shared object created when a participant wants to initiate a new virtual environment 20.

The operations server 18 provides the first participant access to the shared object 22 and allows the first participant to control playback of the at least one video file on the master remote device 12. The operations server 18 allows the second participant to view the at least one video file through the shared object 22, simultaneously with, and as controlled by, the first participant.

The at least one video file may be stored on the media server 16, on another media server (not shown). In one embodiment, before or after the first participant initiates the virtual environment 20, the first participant may upload the at least one video file to the media server 16, or another server (not shown) to which the media server 16 has access.

Alternatively, the at least one video file may be a video stream from another source, so as a camera located at another location. In one embodiment, the media server 16 may receive and buffer the streamed video file prior to distributing the streamed video to the virtual environment 20 via the remote devices 12, 14 to allow the first participant to control playback thereof.

In one aspect of the present invention, the first participant may control the playback of the video file via a virtual remote control device which is displayed on the master remote device 12. The virtual remote control device may allow the first participant to play, pause, fast forward, and rewind the video file. Additionally, the virtual remote control device provide other functions, such as stop, skip forward or backward a predetermined or variable amount, or other video playback functions.

In another aspect of the present invention, the operations server 18 may allow control of the shared object 22 to be shared or passed from the first to the participant associated with one of the other remote devices 14.

In another aspect of the present invention, the operations server 18 provides a video chat and/or a text chat and/or white board feature viewable on the first and second remote devices 12, 14 and usable by the participants. In one embodiment, the white board function overlies the video on the remote devices 12, 14.

In one aspect of the present invention, where there are multiple participants, it may not be possible to display all of the participants in a separate video conference window simultaneously, thus, a subset of the participants may be displayed. The subset may be based on participant input, e.g., the first participant may select which other participants are shown; or the operations server 18 may randomly select a subset of video conferencing windows to display; or the operations server 18 may use some other criteria to select which video conferencing windows to display.

EXEMPLARY EMBODIMENT

In the exemplary embodiment, the Shared Video on Demand (SVOD) software and experience is accessed by using a web browser on a computer, cellular device, video telephone, television, console gaming system, hand-held gaming system or third party device with Internet access and video playback capabilities. SVOD allows two or more people to watch a video or media asset (Video) on the same timeline at the same time.

At least one but not limited to one person (Master) is required to control the Video, and an unlimited amount of people (Slaves) can connect or join the master to view the same Video. The Master's video playback device has controls for Play/Pause and Rewind/Fast Forward. When the Master uses these controls, his actions affect not only his own video playback device, but also each Slave's video playback device. The Master also has the option to relinquish or share the role of Master with one or more Slaves by using a button on the video playback device or webpage.

Traditional applications of watching video include the Internet, broadcast television, and hand-held or other video playback devices that use recorded video on physical media or a digital signal. Broadcast television uses the concept of a single signal per channel that multiple people can subscribe to. SVOD differs by not only allowing the viewer to take the role of the broadcast television channel and allow others to subscribe to his/her own programming, but also fully control the playback timeline and content in a live capacity.

Third party software packages are utilized and all or some may be required for an SVOD implementation. Versions may vary but will always reflect the latest available software version released by the authors. These software packages include but are not limited to:

Adobe Flash Version CS3
Adobe Flash Media Server Version 2
Adobe Flash Interactive Server Version 3
Adobe Flash Streaming Server Version 3
Apache HTTP Server Version 2
PHP Version 5
MySQL Version 5
PHP/HTML Specs and Code Examples Apache HTTP Web Server v2 (Web Server) is used along with MySQL v5 (Database) and PHP v5 (PHP) to produce a webpage that the SWF and application interface is to be displayed on. There are two types of pages served—Master and Slave. The type of page determines which arguments are included and the application's behavior in a Master/Slave capacity when loading the SWF.

Example HTML for Master/Channel Owner

```
<embed
   type="application/x-shockwave-flash"
      pluginspage="http://www.macromedia.com/go/getflashplayer" />
      src="/swfs/svod_player.swf"
   flashvars="owner=true&username=
   Chris&so_id=1&stream_name=VideoName&stream_
   id=123
      width="480" height="310"
      allowScriptAccess="sameDomain"
      allowFullScreen="true"
   />
```

Example HTML for Slave/Channel Participant

```
<embed
   type="application/x-shockwave-flash"
      pluginspage="http://www.macromedia.com/go/getflashplayer"
      src="/swfs/svod_player.swf"
   flashvars="owner=false&so_id=1 "
      width="480" height="310"
      allowScriptAccess="sameDomain"
      allowFullScreen="true"
   />
```

Flash Media Server Application

Connections for SVOD from client applications to the Flash Media Server are managed and controlled by a server-side application (script). This code accepts the connection from the client application. It creates a new Shared Object and sets the "online" property to TRUE if the client is loaded in Master mode. Upon the client application disconnecting from the server, the "online" property is set to FALSE if the client is loaded in Master mode. Creating a Shared Object allows other Slave clients (swf) to connect to the Flash Media Server and share the same data in real-time. A FMS application must be created with the following actionscript:

Server-Side ActionScript Code (main.asc)

```
// load default fms components
load("components.asc");
application.onAppStart = function( ) {
   application.allowDebug = true;
}
application.onConnect = function(clientObject, so_id, iscontroller) {
   // if this is controller, set to online
   if(iscontroller) {
      clientObject.iscontroller=true;
      if(application.app_so = SharedObject.get(so_id)) {
         trace("got shared object");
      } else {
         trace("failed to get shared object");
      }
      // check if controller is already online
      isOnline = application.app_so.getProperty("online");
      if(isOnline == true) {
         // disconnect current controller
         trace("master is already connected.. sending disconnect");
         application.app_so.setProperty("newMaster", true);
      }
      // initialize shared object
      application.app_so.setProperty("online", true);
   } else {
      trace("setting as client - soid: " + so_id);
   }
   application.acceptConnection(clientObject);
}
application.onDisconnect = function(clientObject) {
   if(clientObject.iscontroller) {
      trace("setting as offline");
      if(application.app_so.getProperty("newMaster")) {
         trace("stale master turning off newMaster flag");
         application.app_so.setProperty("newMaster", false);
      } else {
         application.app_so.setProperty("online", false);
      }
   }
}
```

Flash/Actionscript

Each Master client is assigned a unique Shared Object that he and other Slave clients use to trade "SVOD commands". The Shared Object and its unique ID is determined by the flag "so_id" passed in with the <embed>HTML tag. SVOD commands are functions programmed into the swf client using ActionScript that affect the state of the video player. When a Master hits Pause, he must send an SVOD command and receive the command from the FMS server in order for the SVOD command to affect the video player.

The ActionScript method that is used for communications between clients is SharedObject.send( ). It is used to asynchronously execute a method on all the Flash clients subscribing to the same Shared Object. When the Master client uses the controls on the SVOD video player (play/pause, fast forward/rewind, change video) the action he performs triggers a "global command" by using SharedObject.send( ). Each client has a set of functions to control the state of the video player:

Valid SVOD Commands:

1) rfu—When a Slave connects to the FMS server (Shared Object) the first thing it does is send a rfu (request for update) command. If there is a Master client connected it will respond with a client_rfu command 2) client_rfu—When the Master responds to the RFU it will update the Shared Object with the properties stream_id, is Playing, curpos, updatedfor, and timestamp 3) update—switch video to the defined stream_id and set current time, stream name and position on the player 4) seek—change position in the currently playing video (fast forward/rewind)

5) play/pause—play or pause the currently playing video

Example Send( ) Command:

```
public function updateVideo(videoId:String, videoTitle:String,
   isPlaying:Boolean = true, time:Number = 0, age:Number=0):void {
      _videoId = videoId
      _videoTitle = videoTitle
      _videoTime = time
      _videoAge = age
      _isPlaying = isPlaying
      var vo:Object = { }
      vo.command = 'update';
      vo.isPlaying = _isPlaying
      vo.stream_id = _videoId
      vo.stream_name = _videoTitle
      vo.curpos = _videoTime
      vo.timestamp = getTimeStamp( )
      _so.send('ReceiveCommand', vo);
   }
```

Example Receive Command:

```
private function onReceiveCommand(obj:Object):void {
   if (_owner) {
      // reply to RFU requests
      if(obj.command == 'rfu' && _uid == _master_uid) {
         var rfuObj:Object = { };
         rfuObj.command = 'client_rfu';
         rfuObj.stream_id = (_videoId == null) ? " " : _videoId;
         rfuObj.stream_name = (_videoTitle == null)? "There
is No Video Playing" : _videoTitle;
         rfuObj.isPlaying = _isPlaying;
         rfuObj.curpos = _videoTime;
         rfuObj.updatedfor = obj.requestedby;
         rfuObj.timestamp = getTimeStamp( )
         _so.send("ReceiveCommand", rfuObj);
      }
      // detect incoming commands
      if(obj.command == 'update') {
         receiveVideoUpdate(obj)
      }
   } else {
      // receive RFU response
      if(obj.command == 'client_rfu' && obj.updatedfor == _username) {
         // play video at current position
         receiveVideoUpdate(obj)
      }
   }
}
```

Flash Properties/Variables 1) stream_id—the filename of the currently playing video 2) stream_name—the name of the currently playing video 3) is Playing—true if the Master client is actively streaming a video 4) curpos—the current timeline position of the currently playing video 5) updatedfor—when a Master responds to an rfu command with a client_rfu command, this is the id of the client that requested the rfu. This tells the Slave client that the update was for him, and to go ahead and use the video settings (video file, video title, current position)

Server and Hosting Architecture

Figure 2:
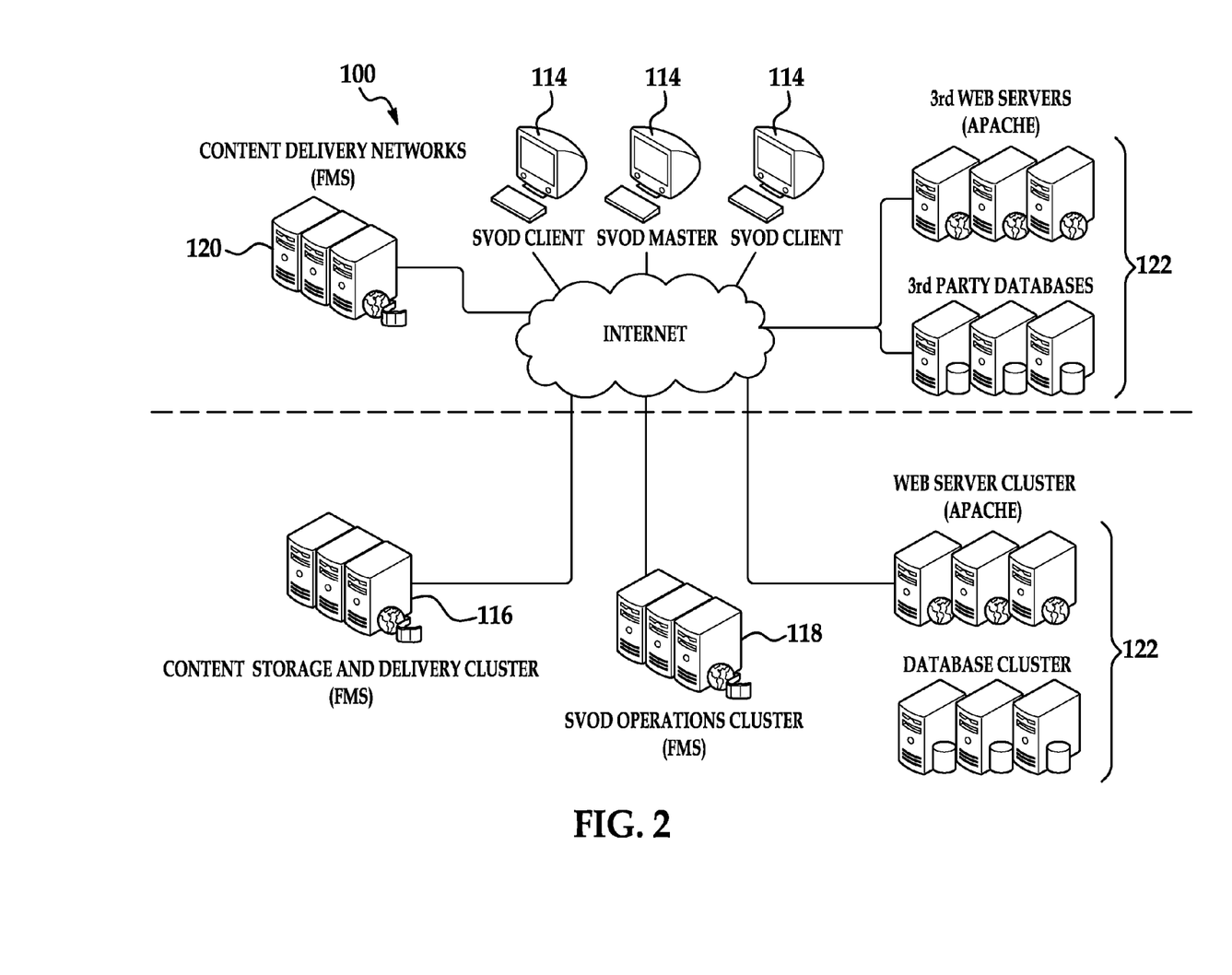
FIG. 2 is a diagrammatic illustration of a system for providing virtual environments in which multiple participants may view video, according to an embodiment of the present invention.

With specific reference to FIG. 2, an exemplary architecture for a shared video on demand (SVOD) system 100 is shown. There are two flash media servers (FMS) connections required for each SVOD client 114, SVOD master 112: Video Streaming and Control/Operations (SVOD Command). These two connections should be managed by the same FMS application, but may be managed by separate applications or FMS servers. For example, create a connection to a local Control Server and an additional connection to a major CDN that provides streaming video services (Akamai, Limelight). Content, i.e., multimedia, video, etc. . . . , may originate at content storage and delivery cluster server(s) 116 at the system provider's location or site and/or via a content delivery network 120. As discussed above, the client and master devices 114, 122 may provide an interface to the participants via web pages displayed on a web browser. The web pages may be served (via the Internet) from local web server and database clusters 124 or remote web server and database clusters 122. The architectural diagram of FIG. 2 provides a redundant and scalable network configuration.

INDUSTRIAL APPLICABILITY

In a first aspect, the present invention is embodied in a system having a virtual environment for providing shared video on demand (SVOD). Such a system or SVOD system could be provided within an existing virtual world environment, e.g., Second® Life, or as a separate virtual world. The format and cultural practicality of these virtual worlds lends itself to harnessing new methodologies of social interaction through a shared media experience. Media delivery at the present time has fed the need for "click and play" environments. However, it has neglected the timeline variances of group interaction. Socialization when combined with media delivery is dependent on a shared experience. The ability to access and view a vast library of media content within a "sub-group", time concurrent format is a natural progression of traditional, singular "on demand" streaming media. In addition to the Metaverse environments, media delivery applications such as "YouTube" promote and deliver media uploaded from the public or provided through internal licenses.

The present invention takes this online delivery context to the next level by building on the resources provided by the object-oriented matrix that emerging virtual communities and media delivery technologies have provided.

The present invention is aimed at enhancing the experience of watching a video over the Internet by allowing users or participants to watch the video simultaneously, i.e., substantially synchronized.

The present invention further enhances this experience by providing a video teach and/or chat functions and by allowing one or more of the participants to control playback of the video. The system of the present invention thus allows husbands to have a "movie date" with their wives while on the road traveling, or Fathers watching a Disney movie with their children "together", when were pulled away on a business trip.

The SVOD system allows participants to see life in a shared screen experience, essentially occupying the same space in a virtual environment at the same time. This allows people in various separate locations to watch video media content "together", sharing the same experience at the same time.

In the prior art, a streaming video is played by a "client" through an Internet connection and he/she receives his/her own stream of data. In order for two people to enjoy the same media at the same time it is necessary for both individuals to press "play" at exactly the same time. What is unique to the SVOD process is the introduction of a simultaneous data stream or a "Shared Object". This concept allows either individuals or multiple members in a group to connect into and watch a piece of media together and yet be watching from different locations. This allows the connected individuals to experience the same media and enjoy the same excitement and experiences at the same time thus increasing the social interaction between the members of the group. When the video "master channel" is paused the video for the entire group is paused and rewind and fast forward in the same fashion. When a new user enters the channel they are automatically cued up to be at the same point in the movie time line for the rest of the group. Then, we have added a proprietary video chat system that gives real emotional "value" to watching a video "together" with some one in a shared virtual experience.

Members of Virtual Communities or MOD's see life in a shared screen experience, essentially occupying the same space in a virtual environment at the same time. This allows people in various separate locations to watch video media content "together", sharing the same experience at the same time. At present times, a streaming video is played by a "client" through an Internet connection and he/she receives his/her own stream of data. In order for two people to enjoy the same media at the same time it is necessary for both individuals to press "play" at exactly the same time.

In contrast, the SVOD system introduces the use of a simultaneous data stream or a "Shared Object". This concept allows either individuals or multiple members in a group to connect into and watch a piece of media together and yet be watching from different locations. This allows the connected individuals to experience the same media and enjoy the same excitement and experiences at the same time thus increasing the social interaction between the members of the group.

A moderator or "director" may exist within this architecture. A moderator would be defined as a member of the media group who has control over both the selection of media and the time sequence associated with that media. For instance, a moderator selects an episode of "selected media" for the group to watch. Within this selection the moderator has play, pause, rewind, and fast forward options for the group. Other group members may make suggestions on what media will play next and could have the functionality of commandeering the moderator position to take on the functionality of the moderator.

Unlimited clients may connect to a virtual space where each participant is watching the same video content simultaneously as the other users in the virtual space. Playback may be controlled by a master player. When the master player presses "pause" the rest of the groups video pauses in the same place. When the Mater Fast Forwards or Rewinds the video all participants see does the same.

Participants have the ability to upload their own videos to share or choose from videos available on the system.

The SVOD system utilizes the "shared object" technology architecture (see above), whereby a virtual environment is created on a server where "clients" or remote participants log into and participate either through a MOD interface or through a traditional web browser to enjoy media occurring within a group dynamic in a singular timeline.

The SVOD system is not limited by the number of groups or group size. New clients entering the system can either opt into an existing group or decide to create their own group for others to join.

Within a virtual community, a programmed grouped line of written code known as a "shared object" can be seen as an actual object and may look similar to a traditional remote control. Users can pass this object or "remote control" from one person to the next, thereby passing the functionality of the system between the group members.

By the moderator pausing or stopping the media on his/her interface the media is subsequently and in real time paused or stopped for the entire group. Groups may be made up of individuals existing within different Metaverse, or in a combination of Metaverse, and traditional browser environments. Group interaction of media can be saved and archived for future individual or group viewing.

Media originating from a live source can be buffered to lend itself to the functionality of the system. For instance, if a group is watching a live concert and the moderator opts to pause the media stream, the concert is paused for the entire group. While the concert is continuing in a real time line, the moderated SVOD group diverges into another time line with all of the above stated functionality of the available media.

Invitations to join or create a SVOD group can be sent through traditional messaging and email systems. Users can be notified that a group is emerging or announcing an invitation to join a collection of groups experiencing media at the same time.

A chat box or other text communication is available for the group. This maintains the real timeline experience between group members regardless of what media is playing within the SVOD media portal.

A video chat window is available to allow users to visually interact with one another as they are watching a video simultaneously together.

Other editing tools such as white boarding and recording the communication between the group can be added to support a post production tool. Film producers and editors can use SVOD to edit and relay changes consulted on within a group scenario.

In one embodiment, a "Flash" media file is either located at a client's location or is uploaded to a server. An "action" or event occurs such as depressing the "Play" button. At that point a streaming video is routed through the Flash Media Server and a shared object (collector and aggregator of data) file is created alongside of the stream and connected to it. Along with the media data within the stream rides a host of other information such as the name of the song and track location information. By referencing this Shared Object the user is able to synchronize another application viewing the same media. In essence, the Shared Object is listening for events riding down that data stream. The user is left with multiple streams that are being controlled by a master Shared Object.

DEFINITIONS

Streaming Internet Video can be referred to as: a file made up of 'moving images' that is sent in compressed form over the Internet and displayed by the viewer as it arrives. Streaming media is streaming video with sound. With streaming video or streaming media, a user does not have to wait until a large file is downloaded to their PC before seeing the video or hearing the sound. Instead, the media is sent in a continuous stream and is played as it arrives. The user needs a player which is a special program that decompresses and sends video data to the display and audio data to the speakers. A player can be either an integral part of a browser or downloaded from a software maker's Web site. Streaming video is usually sent from pre-recorded video files, but can also be distributed as part of a live broadcast 'feed'.

In a second aspect, the present invention may be embodied a system and methodology for creating, compiling, managing and distributing works of multi-media within a virtual meeting space. The system consists of a server and client architecture. Within this architecture, the server or controller plays a "master" role, pulling storing and delivering media content from a plurality of client sources. The master server or controller manipulates the storage and delivery of these streams through an intelligent data base and programming architecture. These streams may be encoded to a specific format and delivered through a server or servers to single or multiple recipients as a vital component of a complete, virtual meeting experience. The result is a complete and organized virtual meeting room experience from attendee invitation through follow-up and recorded meeting dispersal.

A Streaming Media Delivery System may consist of a "Master Server" and a "Passive Client" relationship, where the server pulls multi-media from the client in form of either a direct data stream, such as an external or internal camera connected to the client, or from an existing client computer file for the specific purpose and intention of presentation within a virtual environment.

An intelligent Server Architecture may consist of server side applications responsible for receiving and placing generated presentation files into an intelligent data base structure. Internet Browser pages running scripts can then access this database to include appropriate presentation media content based on the overall, predetermined vision of the presenter.

An Application Service Provider methodology may be used for the client creation, management and distribution of uploaded or created multi-media streams exists. The invention may be "Web Based", meaning that there is no required downloads by the presenter or attendees.

The system may utilize Streaming Online Audio and Video. This includes Meta data tagging, Delivery Security and Protection, Streaming Server/Client Architecture, Bandwidth Detection and Management and Data Base and Programming Intelligence.

The system may create a virtual meeting room used for presentation having a unique URL or address on the Internet that can be included in the process flow of a virtual meeting room environment.

The system may include a presentation system that is comprised of multiple video conferencing windows that are assigned and maintained by the system. A virtual meeting may consist of more attendees than conferencing windows available and therefore the display of attendee vs. video conferencing window may be rotated in and out amongst the group depending on presenter, flow or random delineation.

The system may contain a central presentation area of a users screen. A "drop and drag-able" space that allows the presenter or attendees to display for the group any file of any type for the group.

The system may employ a media distribution architecture for Shared Video On Demand. Functionality of which, includes a layer of programming code within and around the media stream to control the delivery of the media stream to single or multiple attendees and presenters within a virtual meeting space. This architecture is unique in the ability to present video, multimedia files in a group environment with a singular video player control given to the presenter.

The system may have the ability to detect the band width connection of each attendee and deliver and delineate the appropriate file size based on that connection size.

The streaming media delivery system may have the intuitive ability through programming and manipulative Data Base Architecture to accurately convey the meaning and emotion of the presenter within the context of where, when and how a piece of streaming media interacts with the shared presentation space.

A possible embodiment of the system might be an artist's rendering of a "War" piece. Multiple videos of news broadcasts are strung together, streaming through the inventive method while a collage of related images and other visual effects are surrounding the stream. The artist also has the ability to randomize the stream presentation, introducing several different randomly played videos within the work as the web page or presentation is refreshed. The result would be a "living" work of art, which leverages the control and random delivery features of the invention to enhance the creative impact the artist has on his/her target audience.

A possible embodiment of the system might be an artist's rendering directed at a specific target audience, such as a relative, friend or groups of each. While a video collage is playing in the center of the screen, other imagery is rotating on a slide show within the space surrounding the streaming video. Both artistic mediums combined together to have an emotional sum greater than the individual parts.

The present invention is directed towards a web based system for streaming multi-media to the virtual canvases of online Artwork. The system consists of a server computer, a single artistic source and a plurality of patron user computers that are coupled through a network such as the Internet. In the preferred embodiment, the inventive Streaming Media system is accessible through a website, GUI interface that allows both the artists and the art patrons, (users) to access the canvases of online artistic works through a browser program to display the vital streaming media content, which is then completed by the presence of other artistic visual effects.

With particular reference to FIGS. 3-7, in a third aspect of the present invention, a Shared Video on Demand (SVOD) system 200 allows users and clients to see life in a shared screen experience, essentially occupying the same space in a virtual environment at the same time. This allows people in various separate locations to watch video media content "together", sharing the same experience at the same time.

In the prior art, a streaming video is played by a "client" through an Internet connection and he/she receives his/her own stream of data. In order for two people to enjoy the same media at the same time it is necessary for both individuals to press "play" at exactly the same time.

Figure 3:
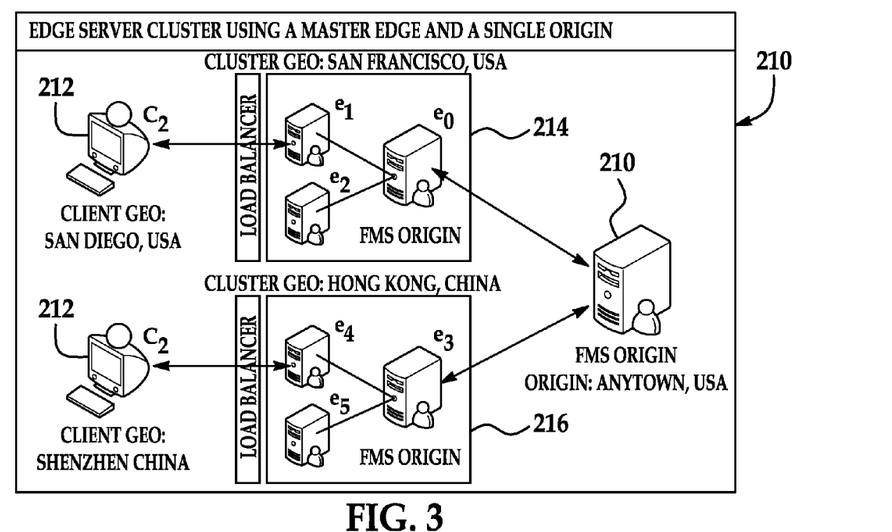
FIG. 3 is a second diagrammatic illustration of a system for providing virtual environments in which multiple participants may view video, according to an embodiment of the present invention.

In the illustrated embodiment, one person has a master television or master device 210, and many, many others have slave televisions or devices 212. The master set 210 chooses which video is being watched by all of the others. They can fast forward, rewind, pause, and change videos like a Video DJ or a, "VJ". While they are doing this, people can interact with each other using video chat, text chat, emoticons, and more.

Users are able to program their own individual channel playlists from videos, which they may either select from a public library of programming, or upload their own media to watch in synchronicity with their friends. This is truly appointment television that comes with interactive calendars and invitation systems to bring your groups together online for a complete social experience. The new amount of interactivity and socialization that nxtgen.tv, brings to the online shared media experience is incalculable.

Monetizing Media Delivery System

For those who choose to set additional revenue creation and growth as a priority within their overall media delivery schemes. These include:

Ad Formats

The devices 210, 212 are preconfigured with support for rich-media ad units that range from standard to cutting-edge, to drive maximum value.

Synched Ad Units—Rich-media banners synchronized to video roll, including expandable banners.

Rich-Media Banners—Build ads that graphically will entice users.

Player Takeovers—Create immersive brand experiences with takeover ads. These rich, interactive experiences pause the video, take over the player's surface, and then seamlessly resume video play when the consumer closes the ad.

Overlays—Offer ad units that overlay the lower third of the video window, letting the system operator generate ad revenue without disrupting the viewing experience.

Custom Insertion Control

Control the insertion or ad slotting rules resulting in a highly customized user experience. These include:

Video Pre-Roll—Insert video ads at the beginning of a video title.

Video Mid-Roll—Insert video ads at any point in a title.

Video Post-Roll—Insert video ads at the end of a title.

Title-Based Insertion—Configure the devices 210, 212 to insert ads when consumers switch titles, either after every title or at other custom frequencies.

Time-Based Insertion—Set devices 210, 212 to insert ads—including banner changes, overlays, and video roll synched with banners—based on the amount of time the consumer spends in the player.

On Load Takeover—Set up the devices 210, 212 to insert a player takeover on load, providing an immediate brand awareness opportunity.

First Play Rules—Establish a time-based or title-based criteria for the first ad played during a user session.

Ad Unit Frequency—Set the specific number of videos and rich-media ads to be played at each insertion point.

Ad Targeting

The system 200 offers a wide range of targeting options.

Player Targeting—Target ads to specific players that may represent sections of websites, affiliate networks, or Social Networking channels.

Lineup Targeting—Target ads to specific lineups that may run in one or multiple players in the network.

Title Targeting—Target ads to specific video titles in the media distribution network.

Geo Targeting—Target ads to specific geographic locations.

Frequency Capping—Control the number of times viewers in yhr network see an ad.

Key Value Identifiers—Target ads to specific criteria that are associated with insertion points within the devices 210, 212.

Reporting and Analytics

Quickly investigate ad and user metrics within both graphical and statistical formats. The system 200 supports a variety of built-in analytics capabilities, ranging from quick dashboard summaries to detailed traffic and transaction data. The reports are integrated directly into the a dashboard, gives a broad over view of the distribution metric performance. Operations control and media distribution are handled via distributed and local server clusters 214, 216.

A few of these include:

Activity Reports—Identify a user's viewing patterns and monitor the performance of specific titles, lineups, users and players. Know exactly who watched what, when and where.

Traffic Reporting—Identify the primary sources of traffic to each channel.

Title Completion—See how often a specific title is typically viewed to completion.

Bandwidth Reporting—Track the bandwidth consumed by users viewing system content.

Affiliate Performance—See how much incremental traffic specific affiliates are driving to your content.

Syndicated Content Performance—Understand how individual titles are performing across all of your affiliates.

Custom Analytics—NxtGen.tv can completely customize the information and data collected to include your unique situation.

Downloadable VOD

The system 200 is equipped with a downloadable movie function that comes equipped with a full set of security features allowing a user to watch and enjoy media content offline. This becomes a powerful tool to increase brand awareness when considering the viewing habits of your potential users.

Content Delivery Network

The delivery network is built on the cutting edge Flash Media Server Platform. Engaging Adobe Systems has allowed our programming staff the unlimited flexibility to deliver not only high quality media, but to have total control over every intricate detail within the user experience.

Below is a high level overview of the delivery schematics:

Asset Publishing and Upload

Easily upload media through a number of user-friendly environments including:

Browser-Based Upload—Use a web based browser to upload files directly from your computer to your Nxtgen.tv account. There is no need for any external software to be installed and can be done from any computer connected to the Internet.

Batch Uploading—Leverage a custom FTP format to batch-upload multiple assets, as well as to create multiple custom video libraries, titles and lineups.

Asset Management

Visually browse, classify, and manage video files and graphics within our proprietary Graphical User Interface. Both video and ad insertion assets can be seamlessly moved between public and private channels giving the operator total visual control over a user's experience.

Media Distribution & Social Networking

The system 200 supports a variety of Social Networking strategies that let the operator grow their audience and increase the reach of their media content across the Internet. A few of the major features offered within the system 200 platforms are:

Custom Channel Creation—Allow users to create their own playlists to share with friends.

Friend Notification—Users are kept in touch with a proprietary notification system aimed at virally connecting users to the same channel. Select a time and date for a showing and it becomes more than just a show, it's an event!

Managed Uploads—Allow users to upload their own media content and expand your potential ad base.

Video and Text Chat Conferencing—Users are constantly in touch with our proprietary and easy-to-use video and text chat conferencing systems.

Expanded User Profile—Users are able to configure certain graphical elements of their screen to customize the user experience.

Syndicated Video Players—Configure video players specifically for individual channels or across the entire network.

Programming Control—Centrally manage the content you program within your social network.

Advanced User Settings—Users can quickly adjust their channel settings to add their name to a public channel listing or go private for discrete, intimate conversations.

Syndication Offers—Create public and private channel syndication offers to monetize individual brand offerings.

Affiliate Reporting—Learn how consumers are viewing your content in affiliate websites.

Affiliate Decommissioning—Quickly and easily decommission affiliates that are violating system policies.

Figure 4:
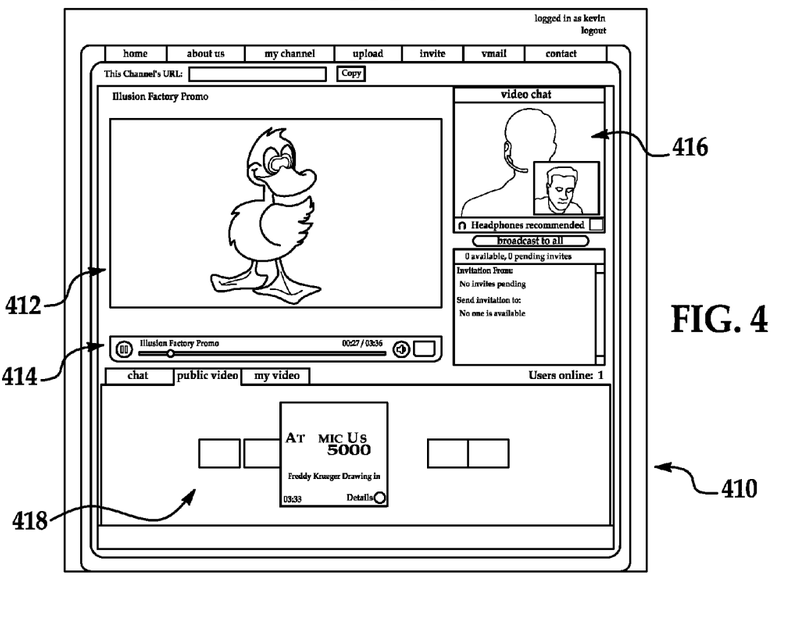
FIG. 4 is a first screen shot of a system providing virtual environments in which multiple participants may view video, according to an embodiment of the present invention.

With particular reference to FIG. 4, an exemplary screenshot of a user interface 410 on a master remote device 18 is illustrated. The user interface 410 includes a video or multimedia section 412 in which a selected video file or stream is presented. The user interface 410 further includes a master controller 414 which allows the participant to control playback of the video file or stream. In the illustrated embodiment, the master controller 414 allows the user to play, pause, mute sound, and position playback along a timeline. The user interface 410 may also include a video chat box 416 which may display live video of another participant the and master participant. In addition, the user interface 410 includes a video selection are 418 which illustrated a list or icons representing the video which are available for synchronized viewing.

Figure 5:
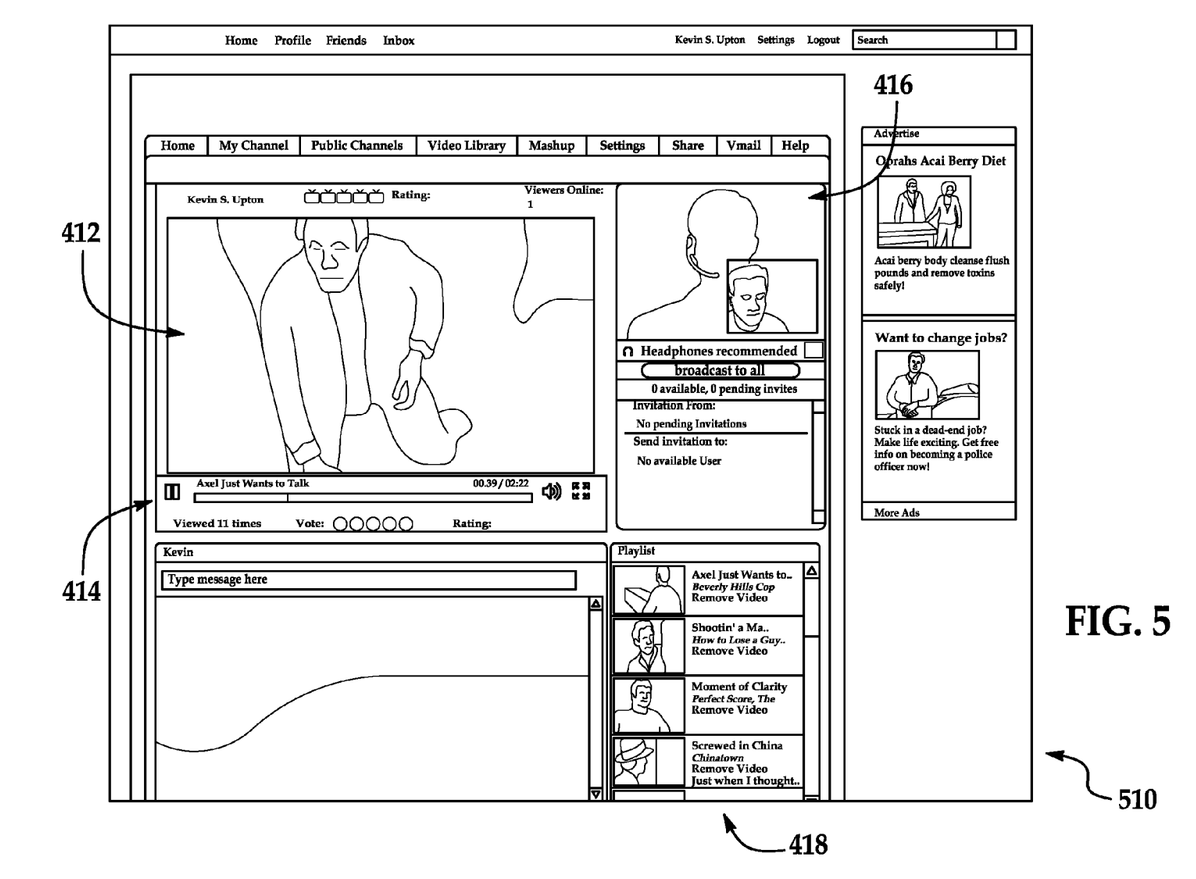
FIG. 5 is a second screen shot of a system providing virtual environments in which multiple participants may view video, according to an embodiment of the present invention.

With particular reference to FIG. 5, in which like elements are numbered in a similar manner, an exemplary screenshot of a second user interface 510 on a master remote device 18 is illustrated. The user interface 510 includes an ad area 520 for the placement of targeted and non-targeted ads.

Figure 6:
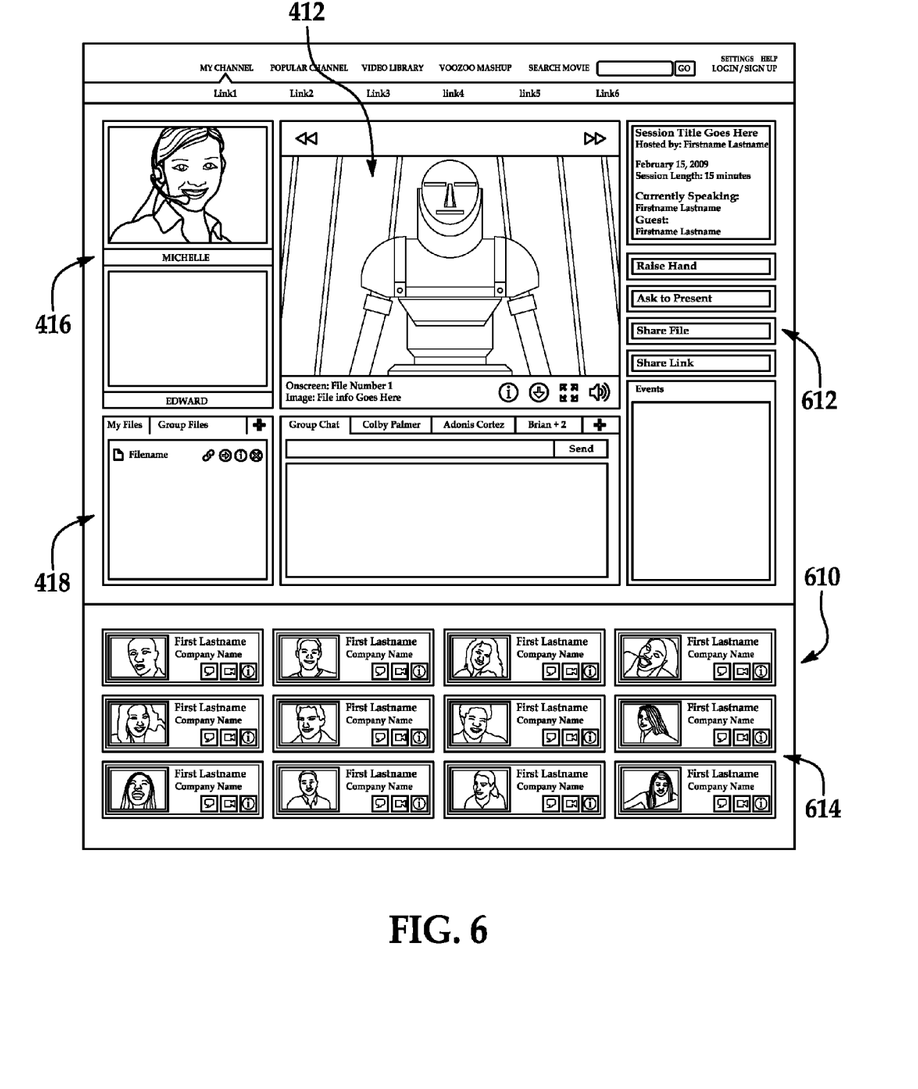
FIG. 6 is a screen shot of a system providing virtual meeting environments in which multiple participants may view video and participate in video chats, according to an embodiment of the present invention; and, FIG. 7 is screen shot of a system which allows a participant to invite others to view a shared video on demand.

With particular reference to FIG. 6, an exemplary screenshot from a user interface 610 of a secondary remote device, in which like elements are numbered in a similar manner. The user interface 610 may be used in a virtual meeting environment. The user interface 610 may display video chat windows of the main participant and another participant 418, and may display separate video chat windows 614 of the other participants (all of the participants or a rotating subset of the participants). Additionally, the user interface 610 may include several buttons 612, which allow the participant to interact with the system 10. For instance, the buttons 612 may allow the participant to raise their hand (which allows them to participate in ongoing discussions); ask they be allowed to present, e.g., control video selection and playback; share or upload a file; and share a link to a website.

Figure 7:
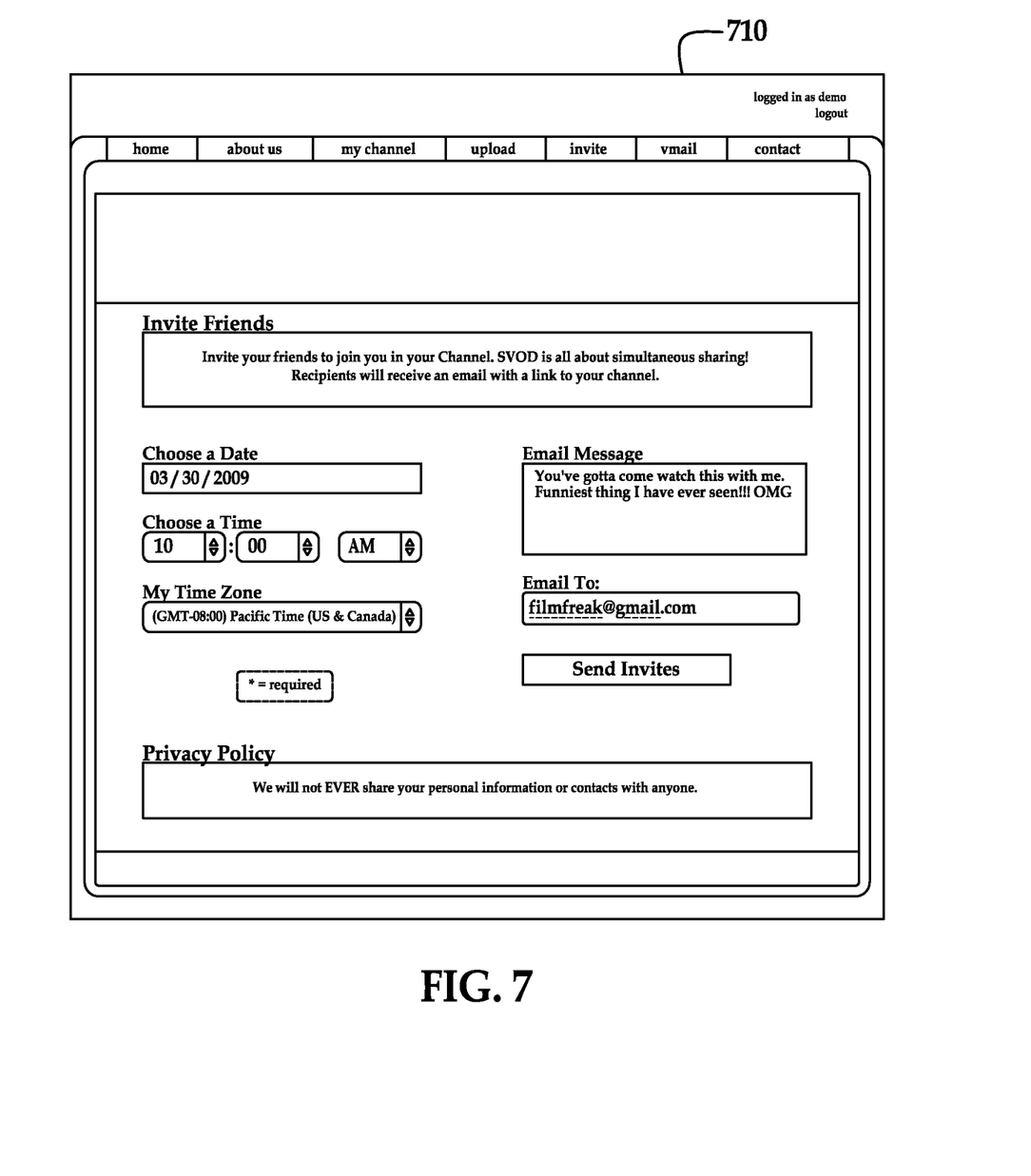

FIG. 7 shows an exemplary screenshot of an invite friends dialog 710 which allows a user to invite others to view a synchronized video file.

Obviously, many modifications and variations of the present invention are possible in light of the above teachings. The invention may be practiced otherwise than as specifically described within the scope of the appended claims.

What is claimed is:

1. A system for providing a centralized peer-to-peer virtual environment in which a plurality of participants may view video, comprising:

a media server serving and providing access to media file;

a master remote client device capable of receiving input from a first participant to initiate creation of a transient shared object corresponding to the media file served by the media server;

a plurality of secondary remote client devices, each coupled to the master remote client device and to other secondary remote client devices, and capable of receiving input from a corresponding one of a plurality of secondary participants and also capable of creating a corresponding transient shared object for each of the plurality of secondary remote client devices in response to the master remote client device creating the shared object, the plurality of transient shared objects being stored in a random access memory of the remote client devices and being deleted after a communication between the master remote client and the plurality of secondary remote client devices has ended;

an operations server networked to the media server, the master remote client device and the plurality of secondary remote client devices, the operations server capable of managing communications between the transient shared object created by the master remote client device and the corresponding transient shared object for each of the plurality of secondary remote client devices, wherein the operations server is capable of receiving input from the master remote client device to update the transient shared object created by the master remote client device and transmitting instructions to update the corresponding transient shared objects for each of the plurality of secondary remote client devices.

2. The system of claim 1, wherein the instructions transmitted from the operations server updates a first transient shared object of a first secondary remote client device and the first secondary remote client device sends instructions to a second secondary remote client device to update a second transient shared object of the second secondary remote client device.

3. The system of claim 1, wherein one of the secondary remote client devices becomes a master secondary remote client device in the peer-to-peer virtual environment and transmits instructions to update its transient shared object and in response the operations server transmits instructions to update the corresponding shared transient objects for the remaining plurality of secondary remote client devices and the master remote client device.

4. The system of claim 1, wherein the media file is stored on the media server.

5. The system of claim 1, wherein the media file is a live video stream, and the media server is configured to buffer the live video stream prior to playing back the video stream through the transient shared object.

6. The system of claim 1, the operations server further being configured to provide a video chat feature viewable at the master remote client device and the plurality of secondary remote client devices.

7. The system of claim 1, the operations server further being configured to provide a text chat feature viewable at the master remote client device and the plurality of secondary remote client devices.

8. The system of claim 1, the operations server further being configured to provide a white board feature viewable at the master remote client device and the plurality of secondary remote client devices, the white board function overlying the video on the master remote client device and the plurality of secondary remote client devices.

9. A system for providing a centralize peer-to-peer virtual environment in which a plurality of participants may view video, comprising:

a media server serving and providing access to media file;

a master remote client device capable of receiving input from a first participant to initiate creation of a transient shared object corresponding to the media file served by the media server;

a plurality of secondary remote client devices, each coupled to the master remote client device and to other secondary remote client devices, and capable of receiving input from a corresponding one of a plurality of secondary participants and also capable of creating a corresponding transient shared object for each of the plurality of secondary remote client devices in response to the master remote client device creating the transient shared object, the plurality of transient shared objects being stored in a random access memory of the remote client devices and being deleted after a communication between the master remote client and the plurality of secondary remote client devices has ended; and an operations server networked to the media server, the master remote client device and the plurality of secondary remote client devices, the operations server capable of managing communications between the transient shared object created by the master remote client device and the corresponding transient shared object for each of the plurality of secondary remote client devices, wherein the operations server is capable of receiving input from the master remote client device to update the transient shared object created by the master remote client device and transmitting instructions to update the corresponding transient shared objects for each of the plurality of secondary remote client devices, and wherein the operations server is configured to provide first and second video conferencing windows, the first video conferencing window being associated with the master remote client device and displaying a live video stream associated with the master remote client device and the second video conferencing window being associated with one of the plurality of secondary remote client devices and displaying a live video stream associated with the one of the plurality of secondary remote client devices.

10. The system of claim 9, wherein the operations server is configured to provide a plurality of video conferencing windows, the plurality of video conferencing window being associated with the remaining plurality of secondary remote client devices and displaying a plurality of live video streams associated with the remaining plurality of secondary remote client devices.

11. The system of claim 9, the operations server being configured for selecting a subset of video conferencing windows to display based on input from the remote client devices.

12. The system of claim 9, the operations server being configured for selecting a subset of video conferencing windows to display.

13. The system of claim 9, the operations server being configured to provide a text chat feature viewable of the master remote client device and one of the secondary remote client devices.

14. The system of claim 9, the operations server being configured to provide a whiteboard function in the master remote client device and one of the secondary remote client devices, the white board function overlying the video on the master remote client device and one of the secondary remote client devices.

15. A system for providing a centralized peer-to-peer virtual environment in which a plurality of participants may view video, comprising:

a media server serving and providing access to media file;

a master remote client device capable of receiving input from a first participant to initiate creation of a transient shared object corresponding to the media file served by the media server;

a plurality of secondary remote client devices, each coupled to the master remote client device and to other secondary remote client devices, and capable of receiving input from a corresponding one of a plurality of secondary participants and also capable of creating a corresponding transient shared object for each of the plurality of secondary remote client devices in response to the master remote client device creating the transient shared object, the plurality of transient shared objects being stored in a random access memory of the remote client devices and being deleted after a communication between the master remote client and the plurality of secondary remote client devices has ended; and an operations server networked to the media server, the master remote client device and the plurality of secondary remote client devices, the operations server capable of managing communications between the transient shared object created by the master remote client device and the corresponding transient shared object for each of the plurality of secondary remote client devices, wherein the operations server is capable of receiving input from the master remote client device to update the transient shared object created by the master remote client device and transmitting instructions to update the corresponding transient shared objects for each of the plurality of secondary remote client devices, and wherein the operations server is configured to provide first and second video conferencing windows, the first video conferencing window being associated with the master remote client device and displaying a live video stream associated with the master remote client device and the second video conferencing window being associated with one of the plurality of secondary remote client devices and displaying a live video stream associated with the one of the plurality of secondary remote client devices and the operations sever also being configured to provide at least one of a video chat feature, a text chat feature and a white board feature to the master remote client device and at least one of the plurality of secondary remote client devices.

* * * * *